US012762778B2

(12) United States Patent
Ujitoko et al.

(10) Patent No.: US 12,762,778 B2
(45) Date of Patent: Oct. 13, 2026

(54) SOFTNESS FEELING CONTROL DEVICE, SOFTNESS FEELING PRESENTATION SYSTEM, SOFTNESS FEELING CONTROL METHOD, AND PROGRAM

(71) Applicant: NTT, Inc.

(72) Inventors: Yusuke Ujitoko, Tokyo (JP); Takahiro Kawabe, Tokyo (JP)

(73) Assignee: NTT, Inc., Tokyo (JP)

( * ) Notice: Subject to any disclaimer, the term of this patent is extended or adjusted under 35 U.S.C. 154(b) by 113 days.

(21) Appl. No.: 18/719,935

(22) PCT Filed: Dec. 23, 2021

(86) PCT No.: PCT/JP2021/047989

§ 371 (c)(1),
(2) Date: Jun. 14, 2024

(87) PCT Pub. No.: WO2023/119583

PCT Pub. Date: Jun. 29, 2023

(65) Prior Publication Data

US 2025/0157122 A1 May 15, 2025

(51) Int. Cl.
*G06T 13/80* (2011.01)
*G06T 13/20* (2011.01)

(52) U.S. Cl.
CPC .............. *G06T 13/80* (2013.01); *G06T 13/20* (2013.01)

(58) Field of Classification Search
CPC ......... G06T 13/80; G06T 13/20; G06F 3/048; H04N 5/262
See application file for complete search history.

(56) References Cited

U.S. PATENT DOCUMENTS 9,921,609 B2 * 3/2018 Levesque ................ G06F 3/017
10,126,219 B2 * 11/2018 Shabram .................. G01N 3/08
(Continued)

FOREIGN PATENT DOCUMENTS

DE 102024125093 B3 * 10/2025 ............. A61B 34/30
JP 2013254398 A 12/2013
(Continued)

OTHER PUBLICATIONS

Fakhoury et al. (2015) "The effect of indentation force and displacement on visual perception of compliance", 2015 IEEE World Haptics Conference (WHC), 2015, pp. 88-93, doi: 10.1109/WHC.2015.7177696 [online] Accessed on Dec. 10, 2021, website: https://ieeexplore.ieee.org/document/7177696.

*Primary Examiner* — William Lu

(57) ABSTRACT

A softness impression control device receives designation information for designating a softness impression for a presented visual target, and obtains and outputs a deformation speed index corresponding to a softness impression index indicating a softness impression designated by the designation information using information representing a correspondence between a deformation speed index indicating a deformation speed of a visual target and a softness impression index indicating a softness impression given by the visual target deforming at the deformation speed. By presenting the presented visual target deforming at the deformation speed indicated by the output deformation speed index, it is possible to cause a designated softness impression to be given.

8 Claims, 10 Drawing Sheets

(56) References Cited

U.S. PATENT DOCUMENTS

| | | | | |
|---|---|---|---|---|
| 10,459,521 | B2 * | 10/2019 | Puskarich | G06F 3/016 |
| 11,571,182 | B2 * | 2/2023 | Sandrin | A61B 8/483 |
| 12,478,350 | B2 * | 11/2025 | Sandrin | G01S 7/52042 |
| 2005/0251042 | A1 * | 11/2005 | Sandrin | A61B 8/483<br>600/443 |
| 2010/0170348 | A1 * | 7/2010 | Diaz | G01N 3/42<br>73/862.621 |
| 2014/0320436 | A1 * | 10/2014 | Modarres | G06F 1/1652<br>345/173 |
| 2015/0115636 | A1 * | 4/2015 | Shiomi | B25J 15/00<br>901/39 |
| 2015/0378492 | A1 * | 12/2015 | Rosenberg | G06F 3/04144<br>345/174 |
| 2018/0267608 | A1 * | 9/2018 | Zhang | G06F 3/0412 |
| 2020/0285340 | A1 * | 9/2020 | Rosenberg | G10H 1/055 |
| 2021/0022709 | A1 * | 1/2021 | Sandrin | A61B 5/6844 |
| 2022/0137706 | A1 * | 5/2022 | Giraud | B06B 1/0276<br>345/173 |

FOREIGN PATENT DOCUMENTS

| | | | | |
|---|---|---|---|---|
| JP | 2015531907 | A * | 11/2015 | G06F 3/011 |
| WO | WO-2023119583 | A1 * | 6/2023 | G06F 3/048 |

* cited by examiner

| DEFORMATION SPEED INDEX | SOFTNESS IMPRESSION INDEX |
|---|---|
| 0.2 mm/s | 1 |
| 0.5 mm/s | 5 |
| 1 mm/s | 10 |
| 2 mm/s | 20 |
| 4 mm/s | 30 |
| ... | ... |

| DEFORMATION SPEED INDEX | SOFTNESS IMPRESSION INDEX |
|---|---|
| 0.2 TIMES | 0.7 |
| 0.5 TIMES | 0.9 |
| 1 TIME | 1 |
| 2 TIMES | 20 |
| 4 TIMES | 30 |
| ... | ... |

| FRAME NUMBER | MAGNIFICATION OF DEFORMATION SPEED |
|---|---|
| 1 | 1 TIME |
| 2 | 1 TIME |
| … | … |
| 300 | 1 TIME |
| 301 | 2 TIMES |
| … | … |
| 360 | 2 TIMES |
| 361 | 1 TIME |
| … | … |

Fig. 3

SOFTNESS FEELING CONTROL DEVICE, SOFTNESS FEELING PRESENTATION SYSTEM, SOFTNESS FEELING CONTROL METHOD, AND PROGRAM

CROSS-REFERENCE TO RELATED APPLICATIONS

This application is a U.S. 371 Application of International Patent Application No. PCT/JP2021/047989, filed on 23 Dec. 2021, the disclosure of which is hereby incorporated herein by reference in its entirety.

TECHNICAL FIELD

The present invention relates to a technique for controlling a softness impression gained by a person.

BACKGROUND ART

When the same magnitude of force is applied to objects of various softness, the objects deform with different deformation amounts. A person can easily recognize differences in softness of objects simply by observing the state thereof through a video image. That is, differences in deformation amounts of objects in a video image contributes to differences in a softness impression of the objects (refer to Non Patent Literature 1, for example).

CITATION LIST

Non Patent Literature

Non Patent Literature 1: E. Fakhoury, P. R. Culmer and B. Henson, "The effect of indentation force and displacement on visual perception of compliance," 2015 IEEE World Haptics Conference (WHC), 2015, pp. 88-93, doi: 10.1109/WHC. 2015.7177696, [retrieved on Dec. 10, 2021], the Internet <https://ieeexplore.ieee.org/document/7177696>

SUMMARY OF INVENTION

Technical Problem

Based on this, when a deformation amount of an object in a video image is increased in image processing, the object in the video image can be conveyed as being softer than the original object.

However, in a case in which image processing cannot be performed such that the deformation amount becomes larger than that of the original object, the object cannot be felt softer than the original object.

Such a problem is common not only in the case of controlling the softness impression for an object but also in the case of controlling the softness impression for some visual targets (hereinafter, "presented visual target") to be presented.

The present invention has been made in view of such a point, and an object of the present invention is to provide a technique capable of controlling a softness impression for a presented visual target regardless of a deformation amount of the presented visual target.

Solution to Problem

Designation information designating a softness impression for a presented visual target is received, and information indicating a correspondence between a deformation speed index indicating a deformation speed of the visual target and a softness impression index indicating a softness impression given by the visual target deformed at the deformation speed is used to obtain the deformation speed index corresponding to the softness impression index indicating a softness impression designated by the designation information.

Advantageous Effects of Invention

As a result, a softness impression for a presented visual target can be controlled regardless of a deformation amount of the presented visual target.

BRIEF DESCRIPTION OF DRAWINGS

FIG. 3 is a diagram for illustrating a deformation speed index indicating a deformation speed having a maximum value.

DESCRIPTION OF EMBODIMENTS

Hereinafter, embodiments of the present invention will be described.

[Principle]

First, principles are described.

The present inventor has found a natural law (physiological law) that a person who sees a presented visual target feels different softness depending on a deformation speed of the presented visual target. Experimental results showing this natural law will be illustrated.

<Experiment 1>

Figure 4:
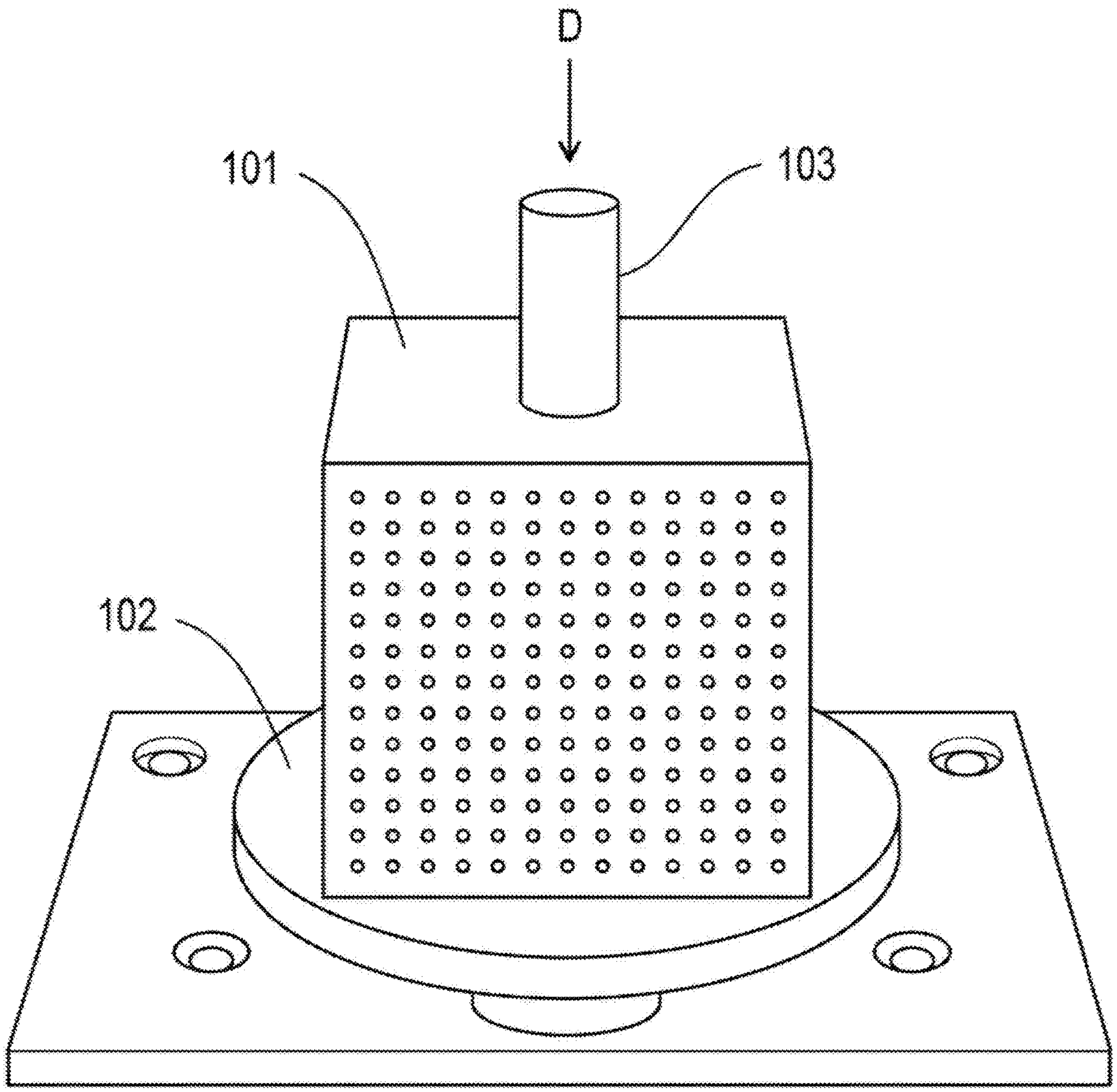
FIG. 4 is a diagram for describing experimental content.

As illustrated in FIG. 4, an elastic body object 101 was disposed on a stage 102, and an upper surface of the elastic body object was pressed downward (D direction) with a rod 103 to deform the object 101. A subject viewed the video image (moving image) and gave answers according to an integer score of 0 to 100 for a subjective evaluation value for a softness impression for the deforming object 101. Here, as the score increases, the softness impression becomes greater, a score 0 indicates that "the subject does not feel soft at all", and a score 100 indicates that "the subject feels the softest in all imaginable ways". The indentation speed of the rod 103 with respect to the object 101 is controlled. Specifically, experiments were performed at five types of indentation speeds (2, 6, 10, 14, and 18 [mm/s]). Similar experiments were performed on 300 subjects.

<Experiment Result 1>

Figure 5:
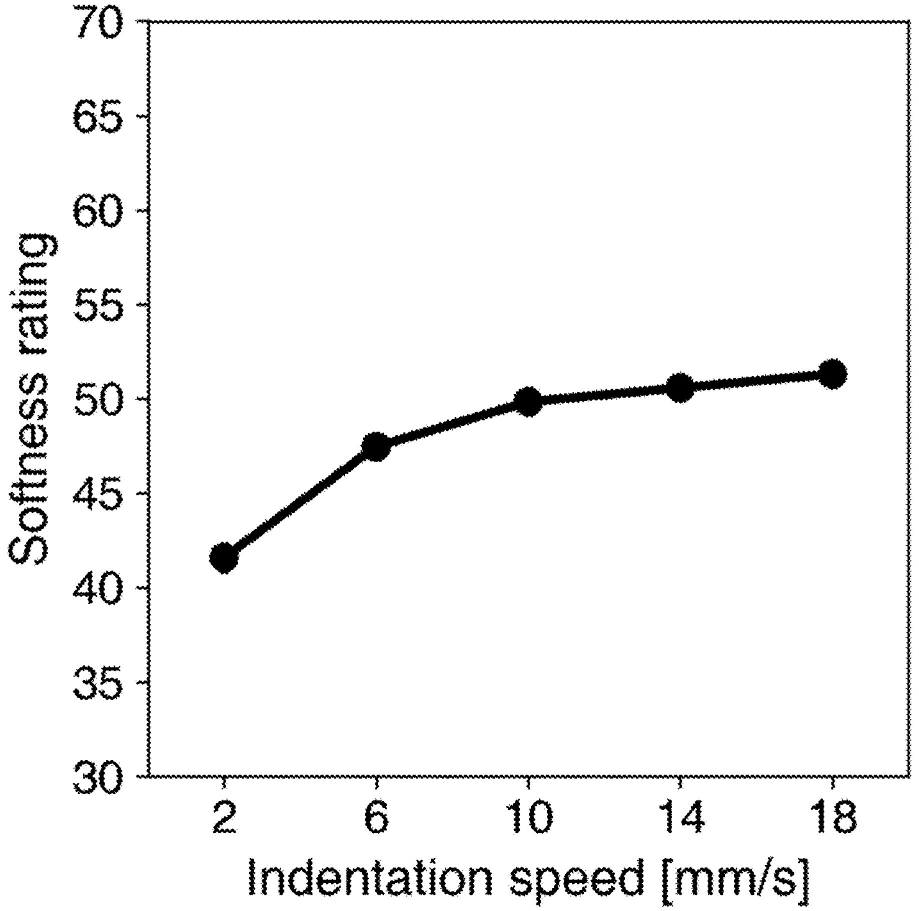
FIG. 5 is a graph illustrating a relationship between an indentation speed with respect to an object and a softness rating of an impression of a person who sees the object.

FIG. 5 shows results of Experiment 1. The horizontal axis in FIG. 5 represents the indentation speed [mm/s] of the rod 103 into the object 101 (five types of indentation speeds which are 2, 6, 10, 14, and 18 [mm/s]). The vertical axis in FIG. 5 represents the average value of softness impression scores (0 to 100) given in the answers of subjects. As illustrated in FIG. 5, the softness impression score given in the answer of the subject varies depending on the indentation speed of the rod 103 into the object 101. That is, the object 101 tends to be perceived as becoming softer as the indentation speed increases (as the indentation speed becomes higher), and the object 101 tends to be perceived as being harder as the indentation speed decreases (as the indentation speed becomes lower). Here, the indentation speed is also a deformation speed of the object 101. Therefore, it can be said that as the deformation speed of the object 101 becomes higher, the softness impression given to a person by the object 101 becomes stronger (the object 101 is perceived as being soft). Conversely, it can be said that as the deformation speed of the object 101 becomes lower, the softness impression given to the person by the object 101 becomes weaker (the object 101 is perceived as being hard).

<Experiment 2>

In Experiment 2, experiments were performed by controlling not only the indentation speed of the rod 103 into the object 101 in the video image but also an indentation length of the rod 103 into the object 101. Specifically, experiments were performed under conditions of five types of indentation speeds (2, 6, 10, 14, and 18 [mm/s]) and five types of indentation lengths (6, 9, 12, 15, and 18 [mm]). The other experimental conditions are the same as in Experiment 1.

<Experiment Result 2>

Figure 6:
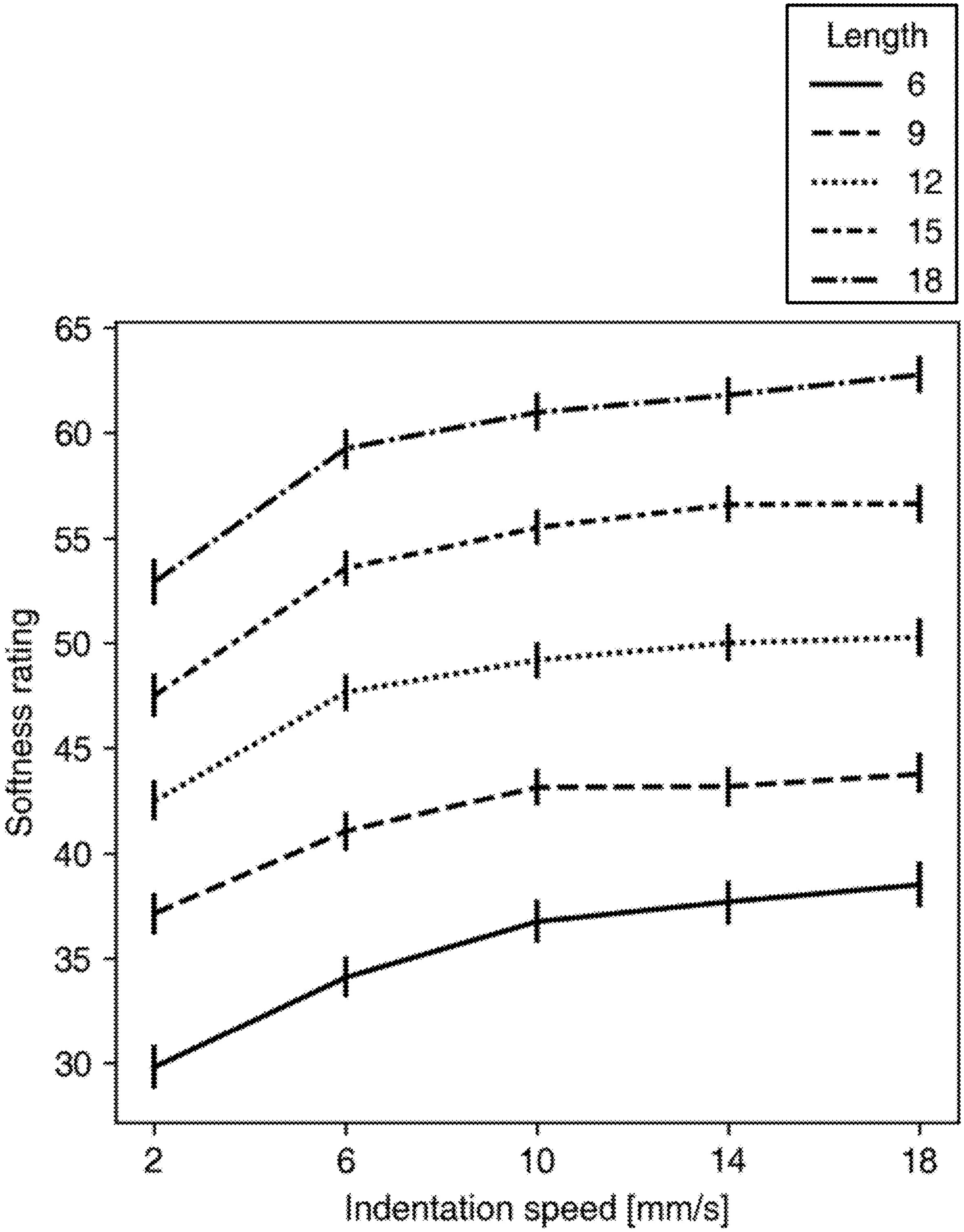
FIG. 6 is a graph illustrating a relationship between a length of indentation to an object, an indentation speed with respect to the object, and a softness rating of an impression of a person who sees the object.

FIG. 6 shows results of Experiment 2. The horizontal axis in FIG. 6 represents the indentation speed [mm/s] of the rod 103 into the object 101 (five types of indentation speeds of 2, 6, 10, 14, and 18 [mm/s]). The vertical axis in FIG. 6 represents the average value of softness impression scores (0 to 100) given in answers of subjects. Line types in the graph represent indentation lengths of the rod 103 into the object 101 (five types of indentation lengths of 6, 9, 12, 15, and 18 [mm]). As illustrated in FIG. 6, an effect that it is possible to present different softness impressions depending on deformation speeds of the object 101 is robustly observed regardless of the indentation length. That is, a softness impression score given in the answer of a subject varies depending on the indentation speed of the rod 103 into the object 101 regardless of the indentation length. That is, the object 101 tends to be perceived as being softer as the indentation speed becomes higher, and the object 101 tends to be perceived as being harder as the indentation speed becomes lower. In other words, regardless of the indentation length, a softness impression given to a person by the object 101 becomes stronger as the deformation speed of the object 101 becomes higher, and conversely, the softness impression given to the person by the object 101 becomes weaker as the deformation speed of the object 101 becomes lower. Furthermore, as the indentation length becomes longer, a softness impression given to a person becomes stronger, and conversely, as the indentation length becomes shorter, the softness impression given to the person becomes weaker. Here, the indentation length is also a deformation amount of the object 101. Therefore, as the deformation amount of the object 101 becomes greater, the softness impression given to the person becomes stronger, and conversely, as the deformation amount of the object 101 becomes smaller, the softness impression given to the person becomes weaker. Therefore, by controlling both the deformation speed and the deformation amount of the object 101, a control range of softness impressions given to a person can be widened.

<Experiment 3>

Figure 7A:
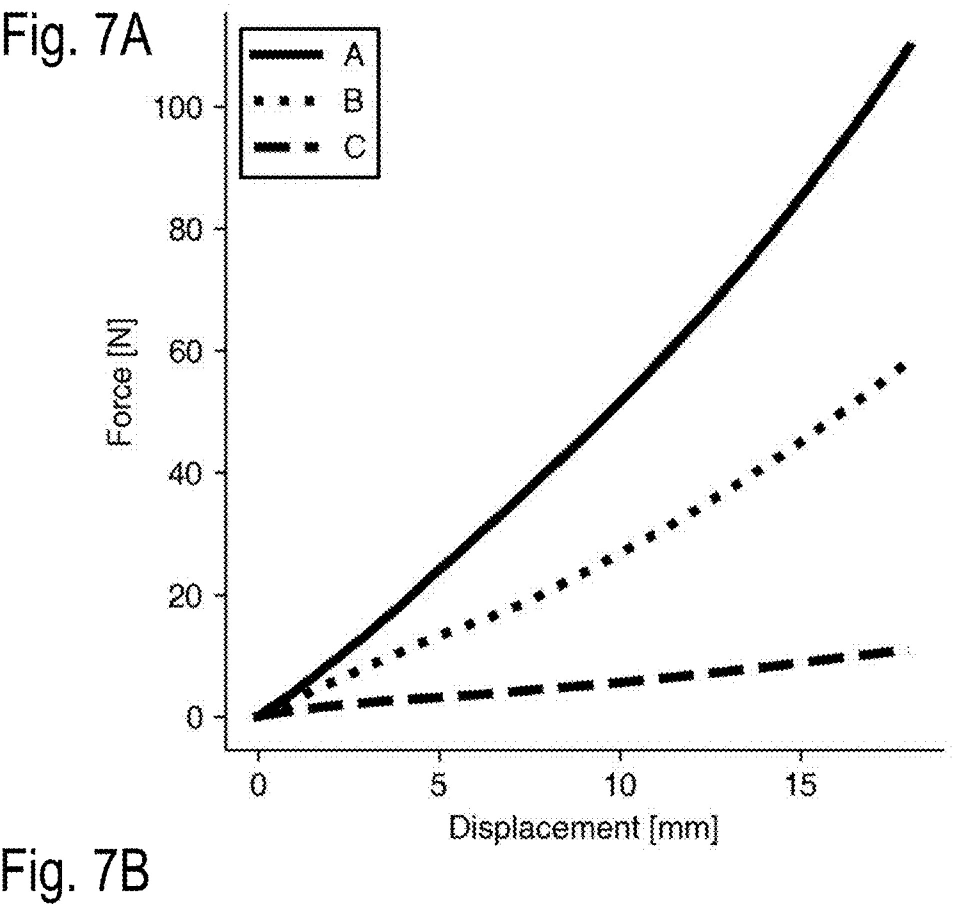
FIG. 7A is a graph illustrating a relationship between an indentation force to an object and a displacement of the object with respect to objects of the three types of materials A, B, and C having different softness.

In Experiment 3, experiments were performed by controlling not only the indentation speed of the rod 103 into the object 101 in the video image but also the physical softness (hardness) of the object 101. Specifically, with respect to objects 101 of three kinds of materials having different physical softness, experiments were performed using a video image obtained by controlling the indentation speed of the rod 103 into the objects 101. Specifically, experiments were performed on the objects 101 of three types of materials A, B, and C having different physical softness under conditions of five types of indentation speeds (2, 6, 10, 14, and 18 [mm/s]). FIG. 7A is a graph illustrating physical softness of the three kinds of materials A, B, and C. In FIG. 7A, the vertical axis represents an indentation force (magnitude of applied force) (Force) [N] of the object 101 of each of the materials A, B, and C into the object 101, and the horizontal axis represents a displacement [mm] of the object 101 when these forces have been applied. The other experimental conditions are the same as in Experiment 1.

<Experiment Result 3>

Figure 7B:
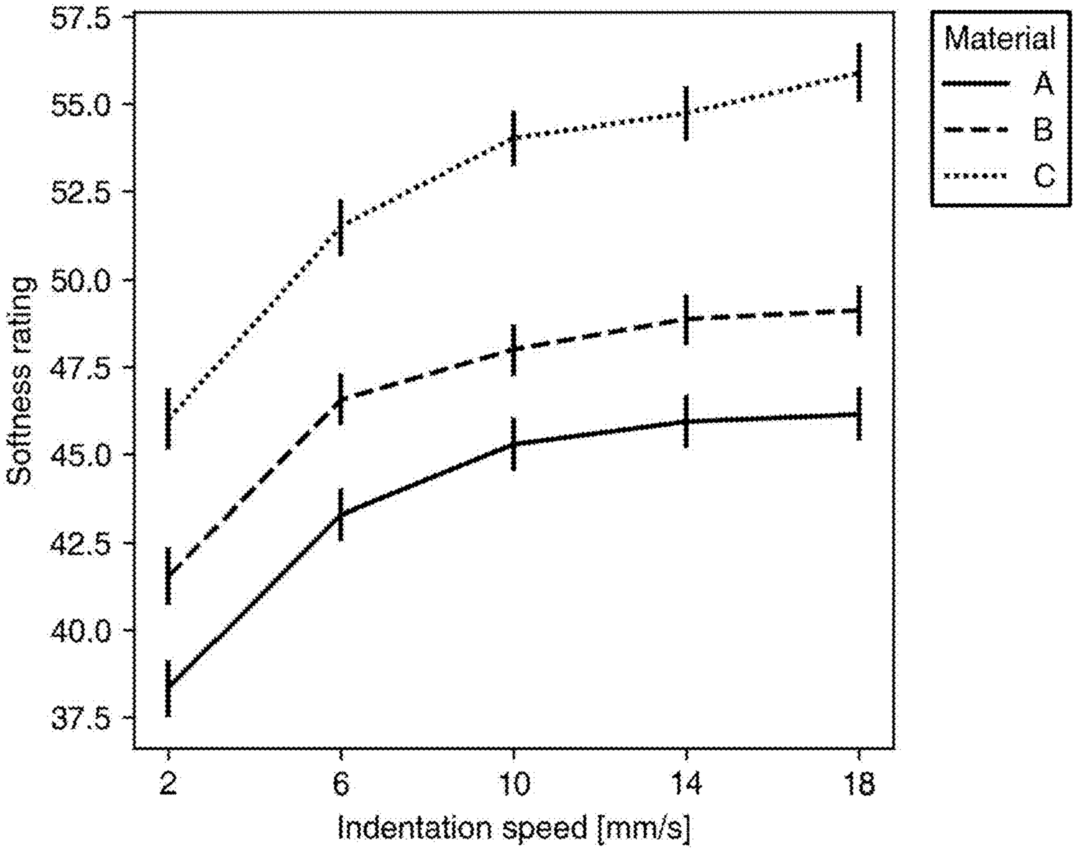
FIG. 7B is a graph illustrating a relationship between an indentation speed with respect to an object and a softness rating of an impression of a person who sees the object with respect to the object including the materials A, B, and C.

FIG. 7B shows results of Experiment 3. The horizontal axis in FIG. 7B represents the indentation speed [mm/s] of the rod 103 into the object 101 (five types of indentation speeds of 2, 6, 10, 14, and 18 [mm/s]). The vertical axis in FIG. 7B represents the average value of softness impression scores (0 to 100) given in answers of subjects. Line types in the graph represent the materials A, B, and C constituting the objects 101. As illustrated in FIG. 7B, regardless of the physical softness of an object 101, an effect that it is possible to present a different softness impression depending on the deformation speed of the object 101 is robustly observed. That is, an object 101 having any softness has a different softness impression score given in the answer of a subject depending on the indentation speed of the rod 103 with respect to the object 101. That is, the object 101 tends to be perceived softer as the indentation speed is higher, and the object 101 tends to be perceived harder as the indentation speed is lower. In other words, regardless of the physical softness of the object 101, a softness impression given to a person by the object 101 becomes stronger as the deformation speed of the object 101 becomes higher, and conversely, the softness impression given to the person by the object 101 becomes weaker as the deformation speed of the object 101 becomes lower. Furthermore, as the object 101 becomes physically softer, a softness impression given to a person becomes stronger, and as the object 101 becomes physically harder, the softness impression given to the person becomes weaker. Therefore, by making it possible to select the physical softness of the object 101 in the real space in addition to the control of the deformation speed of the object 101, a control range of softness impressions given to a person can be widened.

<Consideration>

In the experiments described above, the deformation speed of the object 101 was controlled by indenting the rod 103 into the object 101 (compressing the object 101). However, as long as the deformation speed of the object 101 can be controlled, a similar effect is expected no matter how the object 101 is deformed. For example, even when the object 101 is deformed by being pulled and the pulling speed is controlled to control the deformation speed of the object 101, a similar effect is expected. In addition, for example, even when a shear stress is applied to the object 101 to deform the object and the displacement deformation speed thereby is controlled, a similar effect is expected. In addition, for example, even when the object 101 is twisted and deformed, and the torsional velocity (angular velocity) is controlled, a similar effect is expected. In addition, even when the object 101 is enlarged or reduced and the enlargement speed or reduction speed thereof is controlled, a similar effect is expected. In short, it is sufficient that the deformation speed of the object 101 can be controlled regardless of the manner of deformation of the object 101, a softness impression given to a person by the object 101 becomes stronger as the deformation speed of the object 101 becomes higher, and the softness impression given to the person by the object 101 becomes weaker as the deformation speed of the object 101 becomes lower.

Further, in the above-described experiments, the video image of the deforming object 101 causes a softness impression according to the deformation speed to be given. However, a similar effect is also expected in a case in which a person directly observes the deforming object 101. That is, even when the deforming object 101 is directly observed, a softness impression according to the deformation speed is given. In addition, the shape of the object 101 is not limited, and a similar effect is expected for any shape of an object. Furthermore, not only in a case in which the object 101 is deformed by applying an external force thereto, but also in a case in which the object 101 is deformed by itself, it is possible to cause a softness impression according to the deformation speed to be given. Furthermore, instead of the physical object 101 being deformed, a target drawn by computer graphics or animation may be deformed. A person observing such an image gains a softness impression according to the deformation speed. In short, when a person observes a certain visual target (presented visual target) that deforms, the person gains a softness impression according to the deformation speed. Therefore, by controlling the deformation speed of the presented visual target, it is possible to control a softness impression given to a person who sees the presented visual target.

The relationship between the deformation speed of the presented visual target and a given softness impression can be generalized as follows. That is, a softness impression given by a presented visual target deforming at a first deformation speed is greater than a softness impression given by a presented visual target deforming at a second deformation speed (second deformation speed lower than the first deformation speed) lower than the first deformation speed. Note that a high softness impression means that it is given as being softer. For example, a presented visual target with a greater deformation speed (a higher deformation speed) can be perceived as being much softer (perceived as being soft), and conversely, a presented visual target with a lower deformation speed (a slower deformation speed) can be perceived as being less soft (perceived as being harder).

Note that a deformation speed of a presented visual target may or may not be constant. For example, a deformation speed in a first time interval may be different from a deformation speed in a second time interval different from the first time interval. For example, a deformation speed may be at an extreme value (maximum or minimum) at a particular point in time or time interval.

Furthermore, as described above, by controlling both the deformation speed and the deformation amount of the presented visual target, the control range of softness impressions given by the presented visual target can be widened. Similarly, by controlling both the deformation speed and the physical softness of the presented visual target, the control range of softness impressions given by the presented visual target can be widened. Furthermore, by controlling the deformation speed, the deformation amount, and the physical softness of the presented visual target, the control range of softness impressions given by the presented visual target can be further widened.

Further, in a case in which the presented visual target includes a plurality of visual targets, if the deformation speed is independently controlled for each visual target, it is possible to cause a different softness impression to be given for each visual target. For example, in a case in which the presented visual target includes a first presented visual target and a second presented visual target presented together with the first presented visual target, the deformation speed of the first presented visual target may be different from the deformation speed of the second presented visual target. As a result, it is possible to cause softness impressions different from each other to be given for the first presented visual target and the second presented visual target.

First Embodiment

A first embodiment will be described. In the present embodiment, an example in which a presented visual target is a video image, and a softness impression given to a person is controlled by controlling a deformation speed in the video image will be described. Note that, in the following description, the same reference numerals may be cited to simplify the description of the matters already described.

<Configuration>

Figure 1:
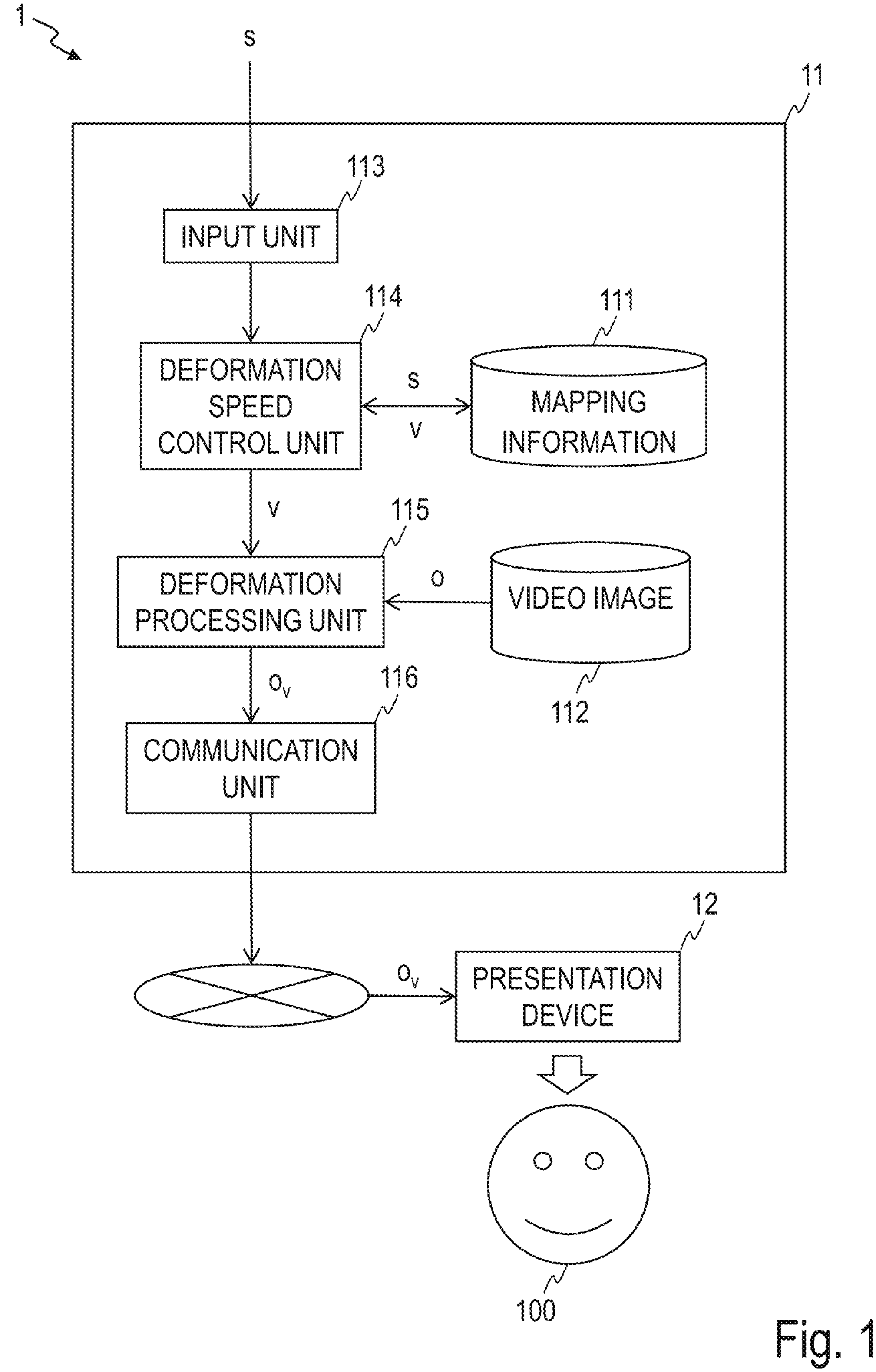
FIG. 1 is a block diagram illustrating a configuration of a softness impression presentation system 1 of a first embodiment.

As illustrated in FIG. 1, the softness impression presentation system 1 of the present embodiment includes a softness impression control device 11 and a presentation device 12, and controls a softness impression perceived by a user 100 (person) according to the devices. In the present embodiment, an example in which the softness impression control device 11 and the presentation device 12 are configured such that they can communicate via a network will be described. However, this does not limit the present invention. The softness impression control device 11 includes storage units 111 and 112, an input unit 113, a deformation speed control unit 114, a deformation processing unit 115, and a communication unit 116. A hardware configuration of the softness impression control device 11 will be described later. The presentation device 12 is a device that visually presents a video image to the user 100. Examples of the presentation device 12 include a display, a projector, VR goggles, and the like.

<Preprocessing>

As preprocessing, a video image (moving image) including a deforming visual target is stored in the storage unit 112.

The video image is, for example, a moving image (a moving image having a plurality of frames) obtained by capturing a deforming object (for example, the above-described object 101). In this example, a video image of the object is the visual target. The video image including the visual target may be a video image of a state in which a person deforms the object, a video image of a state in which a person deforms the object using a tool, or a video image of a state in which an animal or a machine other than a person deforms the object. These video images are desirably captured by a high-speed camera. This is because a video image captured by a high-speed camera has a large number of frames per unit time and a range of deformation speeds that can be controlled by image processing is wide. If the number of frames per unit time is large, the deformation speed of the visual target can be increased by simply thinning out the frames. However, this does not limit the present invention. For example, instead of a video image of a state in which the object has been deformed in the real space, a video image that depicts the deforming visual target by computer graphics, animation, or the like may be stored in the storage unit 112. As long as the deformation speed can be controlled, no matter how the visual target is deformed, the video image may be stored in compression. For example, the video image may be a video image in which the visual target is deformed (compressed and deformed) to be indented, a video image in which the visual target is deformed to be pulled, a video image in which the visual target is deformed to be sheared (shifted and deformed), a video image in which the visual target is deformed to be twisted, a video image in which the visual target is deformed to be enlarged or reduced, or a video image in which some of these deformations simultaneously occur. Further, the video image may be a two-dimensional video image or a three-dimensional video image.

In addition, mapping information is stored in the storage unit 111. The mapping information is information indicating a correspondence (relationship) between an index (deformation speed index) indicating the deformation speed of the visual target and an index (softness impression index) indicating a softness impression given by the visual target deforming at the deformation speed. The relationship between the deformation speed of the visual target and a softness impression given by the visual target deforming at the deformation speed is based on results obtained in advance by experiments performed on persons. For example, the deformation speed of the visual target in the video image is changed in various manners, and a softness impression given to a person who views the video image is given in an answer (refer to experiments 1, 2, and 3 described above, for example). Then, the mapping information may be set on the basis of the correspondence relationship (refer to FIGS. 5, 6, and 7B, for example) between the deformation speed and the softness impression obtained from the results. As described above, a softness impression given by a presented visual target deforming at a first deformation speed is greater than a softness impression given by a presented visual target deforming at a second deformation speed lower than the first deformation speed. Therefore, a softness impression indicated by a softness impression index corresponding to the deformation speed index indicating the first deformation speed is greater than a softness impression indicated by a softness impression index corresponding to the deformation speed index indicating the second deformation speed lower than the first deformation speed. For example, a deformation speed index indicating a higher deformation speed is associated with a softness impression index indicating a greater softness impression.

The deformation speed index may be any index as long as it indicates the deformation speed of the visual target. For example, the deformation speed (physical quantity) of the visual target may be used as the deformation speed index, a relative speed of the deformation speed of the visual target with respect to a reference deformation speed may be used as the deformation speed of the visual target, or function values (for example, a monotonically increasing function value or a non-decreasing function value) of the deformation speed and/or the relative speed may be used as the deformation speed index. The deformation speed (physical quantity) of the visual target may be any speed. For example, the deformation speed (physical quantity) of the visual target may be a displacement speed (for example, the aforementioned indentation speed) of a specific part of the visual target, or may be an average value of a speed vector group (local motion vector group) of the visual target obtained by an optical flow or other statistical values. Further, the reference deformation speed may be any speed. For example, the reference deformation speed may be the deformation speed itself of the visual target of the video image stored in the storage unit 112, or may be a predetermined speed.

The softness impression index may be any index as long as it is an index representing a softness impression given by the visual target deforming at the deformation speed described above. For example, an average value of softness impression scores or other statistical values may be used as the softness impression index, a relative value of an average value of softness impression scores or other statistical values with respect to an average value of softness impression scores of the visual target deforming at the reference deformation speed or other statistical values may be used as the softness impression index, or a function value (for example, a monotonically increasing function value or a non-decreasing function value) of the average value of the scores, other statistical values and/or the relative value may be used as the softness impression index. A softness impression score may be any value as long as it objectively expresses a softness impression. For example, the softness impression scores described in Experiment 1 can be used. Scores in this example are integers of 0 to 100, a larger score indicates a greater softness impression, the score 0 indicates that "the user does not feel soft at all", and the score 100 indicates that "the user feels the softest in all imaginable ways". In addition, a softness impression score may be a value of five stages or seven stages. Alternatively, a physical quantity equivalent to a softness impression given by the visual target may be defined by psychophysical experiments, and the physical quantity equivalent to the softness impression or a function value thereof may be used as the softness impression index. For example, a psychophysical experiment in which a subject observes a video image of a state in which an object pressed by a finger is deformed and selects an object equal to a softness impression given by the video image while pressing actual objects with his/her finger is performed. Then, the average value of hardness (for example, Asker A type hardness values obtained through measurement using a durometer) of the object selected by the subject, other statistical values, or a function value thereof may be defined as the softness impression index corresponding to the deformation speed of the object (visual target) in the video image.

Figures 2A, 2B, 2C:
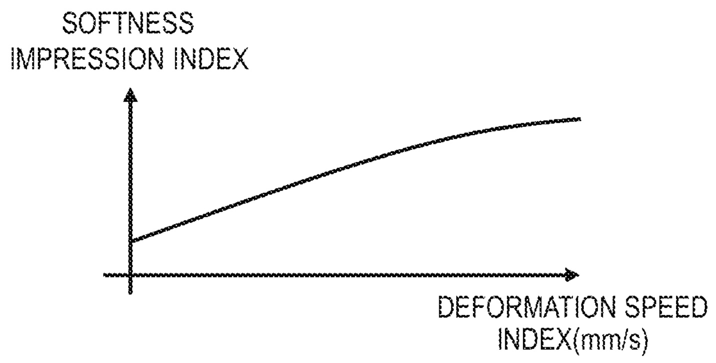
FIGS. 2A to 2C are diagrams for illustrating mapping information indicating a correspondence between a deformation speed index indicating a deformation speed of a visual target and a softness impression index indicating a softness impression given by the visual target deformed at the deformation speed.

The mapping information may be any information indicating a correspondence (relationship) between the deformation speed index and the softness impression index. For example, as illustrated in FIGS. 2A and 2B, a table in which the deformation speed index and the softness impression index corresponding thereto are associated with each other may be used as the mapping information. FIG. 2A illustrates an example in which a deformation speed (physical quantity) of a visual target is used as the deformation speed index, and a relative value of an average value of softness impression scores of the visual target or other statistical values are used as the softness impression index. FIG. 2B illustrates an example in which a relative speed of the deformation speed of the visual target with respect to the reference deformation speed is used as the deformation speed index, and a relative value of the average value of softness impression scores of the visual target or other statistical values with respect to the average value of the softness impression scores of the visual target deforming at the reference deformation speed or other statistical values are used as the softness impression index. For example, as illustrated in FIG. 2C, a function (mathematical model) indicating a correspondence (relationship) between the deformation speed index and the softness impression index corresponding thereto may be used as the mapping information. Such a function is obtained, for example, by machine learning using a correspondence relationship (for example, a set of the deformation speed and the softness impression score) between the deformation speed and the softness impression score obtained through experiments as training data.

<Softness Impression Control Processing>

The following softness impression control processing is executed on the premise of the above-described preprocessing. First, designation information s for designating a softness impression for a presented visual target to be presented is input to the input unit 113 of the softness impression control device 11 (FIG. 1). The designation information s may be input by the user 100 or the like operating a button, a keyboard, or the like (not illustrated), may be transmitted from another application, may be transmitted from the outside through communication, or may be stored in advance in a memory (not illustrated) of the softness impression control device 11. The designation information s may be any information as long as it designates the softness impression for the presented visual target. The designation information s may be, for example, the softness impression index itself, information for specifying the softness impression index, a softness impression score, a physical quantity equivalent to the softness impression, or information for specifying a softness impression score or a physical quantity equivalent to the softness impression. The input unit 113 receives the input designation information s and transmits the designation information s to the deformation speed control unit 114 (step S113).

The designation information s is input to the deformation speed control unit 114. The deformation speed control unit 114 obtains and outputs a deformation speed index v corresponding to a softness impression index representing the softness impression designated by the designation information s using the mapping information (information representing a correspondence between a deformation speed index indicating the deformation speed of the visual target and a softness impression index indicating a softness impression given by the visual target deforming at the deformation speed) stored in the storage unit 111. For example, in a case in which the mapping information is a table (for example, FIGS. 2A and 2B) in which the deformation speed index and the softness impression index corresponding to the deformation speed index are associated with each other, the deformation speed control unit 114 searches the mapping information to obtain and output the deformation speed index v corresponding to the softness impression index indicating the softness impression designated by the designation information s. For example, in a case in which the mapping information is a function indicating a correspondence (relationship) between the deformation speed index and the softness impression index corresponding thereto, the deformation speed control unit 114 applies the softness impression index indicating the softness impression designated by the designation information s to the function, thereby obtaining and outputting the deformation speed index v. The deformation speed index v is sent to the deformation processing unit 115 (step S114).

The deformation speed index v is input to the deformation processing unit 115. The deformation processing unit 115 performs image processing (processing) on a video image o extracted from the storage unit 112 on the basis of the deformation speed index v to obtain and output a video image $o_v$ including a presented visual target (for example, a video image of an object) deforming at the deformation speed based on the deformation speed index v. A specific example will be described below.

Specific Example 1

First, a method of obtaining a video image $o_v$ including a presented visual target deforming at the deformation speed based on the deformation speed index v by simply thinning out frames from a video image o corresponding to a plurality of frames or adding frames to the video image o on the basis of the deformation speed index v will be illustrated.

In a case of obtaining the video image $o_v$ including a presented visual target having a deformation speed higher than that of the visual target included in the video image o, the deformation processing unit 115 thins out frames from the video image o. As a result, the deformation processing unit 115 obtains the video image $o_v$ including a presented visual target deforming at the deformation speed based on the deformation speed index v. For example, in a case in which the total number of frames of the video image o is N, and the deformation speed of the presented visual target is set to X times the deformation speed of the visual target included in the video image o, the deformation processing unit 115 obtains the video image $o_v$ including the presented visual target by evenly or substantially evenly thinning out a total of $N*(1-(1/X))$ frames from the original video image o such that the number of frames becomes N/X. Here, N and X are positive integers satisfying N>X, and N is a multiple of X. For example, in a case in which the deformation speed of the presented visual target is twice that of the visual target included in the video image o, the deformation processing unit 115 thins out the frames of the video image o every other frame.

In a case of obtaining the video image $o_v$ including the presented visual target having a deformation speed lower than that of the visual target included in the video image o, the deformation processing unit 115 adds a new frame to the video image o. As a result, the deformation processing unit 115 obtains the video image $o_v$ including a presented visual target deforming at the deformation speed based on the deformation speed index v. For example, in a case in which the deformation speed of the presented visual target is set to 1/X times the deformation speed of the visual target included in the video image o, the deformation processing unit 115 obtains the video image $o_v$ including the presented visual target by evenly or substantially evenly inserting a total of N*(X−1) new frames between frames of the original video image o such that the number of frames becomes N*X. For example, a new frame to be inserted is a copy of a frame (for example, a frame immediately before or after an insertion position of the new frame) closest to the insertion position of the new frame. Alternatively, frames before and after a new frame to be inserted may be alpha-blended as the new frame. For example, in a case in which M new frames are inserted between certain frames, it is assumed that an i-th frame among the M new frames is alpha-blended by weighting frames before and after the i-th frame by i/M and (M−i)/M. Here, M is a positive integer of 2 or more, and i=1, . . . , M.

Note that the deformation speed based on the deformation speed index v in specific example 1 is a deformation speed indicated by the deformation speed index v or a deformation speed near the deformation speed indicated by the deformation speed index v (for example, a deformation speed closest to the deformation speed indicated by the deformation speed index v), which can be realized by thinning out frames from the video image o or adding frames to the video image o.

Specific Example 2

Specific example 2 is a modified example of specific example 1, and the content of the video image o is analyzed to optimize a deformation speed. For example, the deformation processing unit 115 calculates a velocity vector group (local motion vector group) between frames of the video image o using an optical flow, and defines an average value of magnitudes of the velocity vector group or other statistical values as a deformation speed of a visual target in the frames. For example, the deformation processing unit 115 controls the number of frames such that the deformation speed is constant or substantially constant throughout all the frames, and then, similarly to specific example 1, thins out the frames to increase the deformation speed or inserts new frames to decrease the deformation speed. The rest is the same as in specific example 1.

Note that the deformation speed based on the deformation speed index v of specific example 2 is a deformation speed indicated by the deformation speed index v or a deformation speed near the deformation speed indicated by the deformation speed index v (for example, a deformation speed closest to the deformation speed indicated by the shape speed index v), which can be realized by controlling the number of frames such that the deformation speed is constant or substantially constant throughout all frames and then thinning out frames from the video image o or adding frames to the video image o.

Specific Example 3

Specific example 3 is a modified example of specific examples 1 and 2. In specific example 3, the content of the video image o is also analyzed to optimize the deformation speed. A difference from specific example 2 is that the number of frames is not controlled such that the deformation speed is constant or substantially constant throughout all frames, and the deformation speed is controlled such that the deformation speed changes over a desired time. This makes it possible to present a non-linear softness impression. That is, in specific example 3, a deformation speed (change speed of a presented visual target) based on the deformation speed index v in a first time interval is different from a deformation speed based on the deformation speed index v in a second time interval different from the first time interval indicated by the deformation speed index. For example, the deformation speed based on the deformation speed index v is controlled to be maximum or minimum in terms of time. FIG. 3 illustrates a relationship between a frame number in this case and a magnification of the deformation speed based on the deformation speed index v in the frame (time interval) of the frame number. Here, the magnification of the deformation speed based on the deformation speed index v represents a magnification of the deformation speed (deformation speed of the presented visual target) based on the deformation speed index v with respect to the deformation speed indicated by the deformation speed index v. In the case of the example of FIG. 3, in frames other than frame numbers 300 to 360, the deformation speed indicated by the deformation speed index v is the deformation speed of the presented visual target, and in the frames of the frame numbers 300 to 360, a deformation speed twice the deformation speed indicated by the deformation speed index v is the deformation speed of the presented visual target. The rest is the same as in specific examples 1 and 2 (step S115).

Note that the deformation speed based on the deformation speed index v in specific example 3 is a deformation speed indicated by the deformation speed index v or a deformation speed near the deformation speed indicated by the deformation speed index v (for example, a deformation speed closest to the deformation speed indicated by the shape speed index v), which can be realized by controlling the deformation speed such that the deformation speed changes over a desired time and then thinning out frames from the video image o or adding frames to the video image o.

The video image $o_v$ including the presented visual target output from the deformation processing unit 115 may be stored in the storage unit 112 as a new video image o, may be transmitted to the outside via the communication unit 116, or may be further transmitted to the presentation device 12 (for example, it may be sent to the presentation device 12 in real time). When the video image of including the presented visual target is sent to the presentation device 12, the presentation device 12 visually outputs (displays) the video image $o_v$, and the user 100 appreciates the video image $o_v$. As a result, the user 100 perceives the softness impression designated by the designation information s (step S116).

Modified Example 1 of First Embodiment

In the first embodiment, the softness impression control device 11 performs image processing on the video image o to generate the video image $o_v$ including the presented visual target deforming at the deformation speed based on the deformation speed index v. However, the softness impression control device 11 may generate the video image $o_v$ including a presented visual target whose deformation amount (maximum deformation amount) is also controlled in addition to the deformation speed. In this case, the designation information s may include information for designating a deformation amount, or this information may be input to the softness impression control device 11 independently of the designation information s or stored in advance in a memory (not illustrated). Information for designating the deformation speed index v and a deformation amount is input to the deformation processing unit 115. Using the information, the deformation processing unit 115 controls the deformation speed of the presented visual target on the basis of the deformation speed index v as exemplified in the first embodiment, and also controls the deformation amount of the presented visual target on the basis of information for designating the deformation amount. As a result, the control range of softness impressions to be presented can be widened. Hereinafter, a method of controlling a deformation amount of a presented visual target will be exemplified.

<Deformation Amount Control Method 1>

For example, the deformation processing unit 115 may perform image processing on the basis of the deformation speed index v using not all the frames of the video image o but only some consecutive frames thereof such that a maximum deformation amount of the presented visual target becomes a designated deformation amount to generate a video image $o_v$ including the presented visual target deforming at the deformation speed based on the deformation speed index v. For example, in a case in which the designated deformation amount is 1/Y of the deformation amount of the visual target included in the video image $o_v$, the deformation processing unit 115 may perform image processing on the basis of the deformation speed index v using only consecutive 1/Y (or an integer closest to 1/Y) frames among all frames included in the video image o to generate the video image $o_v$ including the presented visual target. Here, Y is a positive integer. For example, in a case in which the deformation amount of the presented visual target is half the visual target included in the video image o, the deformation processing unit 115 performs image processing on the basis of the deformation speed index v using only half frames of the video image o, and generates the video image $o_v$ including the presented visual target.

<Deformation Amount Control Method 2>

As another method, the content of the video image o may be analyzed to control the deformation amount of the presented visual target. For example, the deformation processing unit 115 calculates a velocity vector group between frames of the video image o using an optical flow, and defines the sum of magnitudes of the velocity vector groups for Z (Z is an integer of 2 or more) frames as a deformation amount of the visual target in the Z frames. Further, the deformation processing unit 115 selects a partial frame group of consecutive Z frames such that the deformation amount defined in this manner becomes the designated deformation amount or approximates the designated deformation amount. Then, the deformation processing unit 115 performs image processing on the basis of the deformation speed index v using the frames of the selected partial frame group to generate the video image $o_v$ including the presented visual target deforming at the deformation speed based on the deformation speed index v. The rest is the same as in deformation amount control method 1.

Modified Example 2 of First Embodiment

A moving image obtained by capturing each of a plurality of objects having different physical softness may be stored in the storage unit 112 as a video image including a visual target. As a result, the softness impression control device 11 can also select a physical softness of a visual target (object) which is the basis of a presented visual target in addition to control of a deformation speed, and generate a video image $o_v$ including the presented visual target. In this case, the designation information s may include information for designating a physical softness of the original visual target, or this information may be input to the softness impression control device 11 independently of the designation information s or stored in advance in a memory (not illustrated). The deformation speed index v and information for designating the original physical softness of the visual target are input to the deformation processing unit 115. The deformation processing unit 115 extracts a video image o obtained by imaging an object having a designated physical softness from the storage unit 112 using the deformation speed index v and information for designating the original physical softness. As exemplified in the first embodiment, the deformation processing unit 115 performs image processing based on the deformation speed index v on the extracted video image o, and generates a video image $o_v$ including a presented visual target deforming at the deformation speed based on the deformation speed index v. As a result, the control range of softness impressions to be presented can be widened. In addition, as exemplified in modified example 1 of the first embodiment, the deformation amount (maximum deformation amount) of the presented visual target may also be controlled. As a result, the control range of softness impressions to be presented can be further widened.

Modified Example 3 of First Embodiment

In a case in which the video image o stored in the storage unit 112 includes a plurality of visual targets (for example, a video image of a plurality of objects), the softness impression control device 11 may independently control a deformation speed for each of the visual targets and generate a video image $o_v$ including the plurality of presented visual targets whose deformation speeds have been independently controlled in this manner. As a result, it is also possible to cause a different softness impression to be given for each presented visual target. In this case, designation information s for independently designating softness impressions for a plurality of presented visual targets is input to the input unit 113. That is, the presented visual targets include a first presented visual target and a second presented visual target presented together with the first presented visual target, and the input unit 113 receives designation information s including first designation information that is designation information for designating a softness impression for the first presented visual target and second designation information that is designation information for designating a softness impression for the second presented visual target. The designation information s is input to the deformation speed control unit 114. Using the mapping information stored in the storage unit 111, the deformation speed control unit 114 obtains and outputs a deformation speed index v corresponding to a softness impression index indicating the softness impression for each presented visual target designated by the designation information s. That is, the deformation speed control unit 114 obtains and outputs a first deformation speed index that is a deformation speed index v corresponding to the softness impression index indicating the softness impression designated by the first designation information and a second deformation speed index that is a deformation speed index v corresponding to the softness impression index indicating the softness impression designated by the second designation information. The deformation speed index v is input to the deformation processing unit 115. The deformation processing unit 115 independently performs image processing on each of the plurality of visual targets included in the video image o extracted from the storage unit 112 on the basis of the deformation speed index v to obtain and output a video image $o_v$ including presented visual targets each deforming at a deformation speed based on the deformation speed index v corresponding to each of the plurality of presented visual targets. For example, the deformation processing unit 115 performs image processing on the first visual target included in the video image o on the basis of the first deformation speed index, and performs image processing on the second visual target included in the video image o on the basis of the second deformation speed index. As a result, the deformation processing unit 115 obtains and outputs a video image $o_v$ including the first presented visual target deforming at the deformation speed based on the first deformation speed index and the second presented visual target deforming at the deformation speed based on the second deformation speed index. For example, the deformation processing unit 115 separates the video image o for each presented visual target, executes processing described in the first embodiment for each video image including each presented visual target, and combines the obtained video images to acquire a video image $o_v$. The rest is the same as that in the first embodiment. Further, as in modified examples 2 and 3 of the first embodiment, in addition to the deformation speed, a deformation amount (maximum deformation amount) may be controlled, or the physical softness of the original first presented visual target that is a subject may also be selectable. In this case, whether to control the deformation speed or to further control the deformation amount may be determined independently for each presented visual target.

Modified Example 4 of First Embodiment

In the first embodiment and modified examples 1, 2, and 3 thereof, the deformation processing unit 115 performs image processing on the video image o on the basis of the deformation speed index v to obtain the video image $o_v$ including the presented visual target deforming at the deformation speed based on the deformation speed index v. However, the video image o including a visual target deforming at a plurality of deformation speeds may be stored in advance in the storage unit 112. In this case, the deformation processing unit 115 selects and extracts the video image $o_v$ including the presented visual target deforming at the deformation speed based on the deformation speed index v from the video image o stored in the storage unit 112 using the deformation speed index v. As a result, the time for obtaining the video image $o_v$ can be shortened.

Second Embodiment

In the first embodiment and modified examples 1 to 4 thereof, the softness impression control device outputs the video image $o_v$ including the presented visual target deforming at the deformation speed based on the deformation speed index. However, the softness impression control device may output a command for deforming the presented visual target at the deformation speed based on the deformation speed index.

<Configuration>

Figure 8:
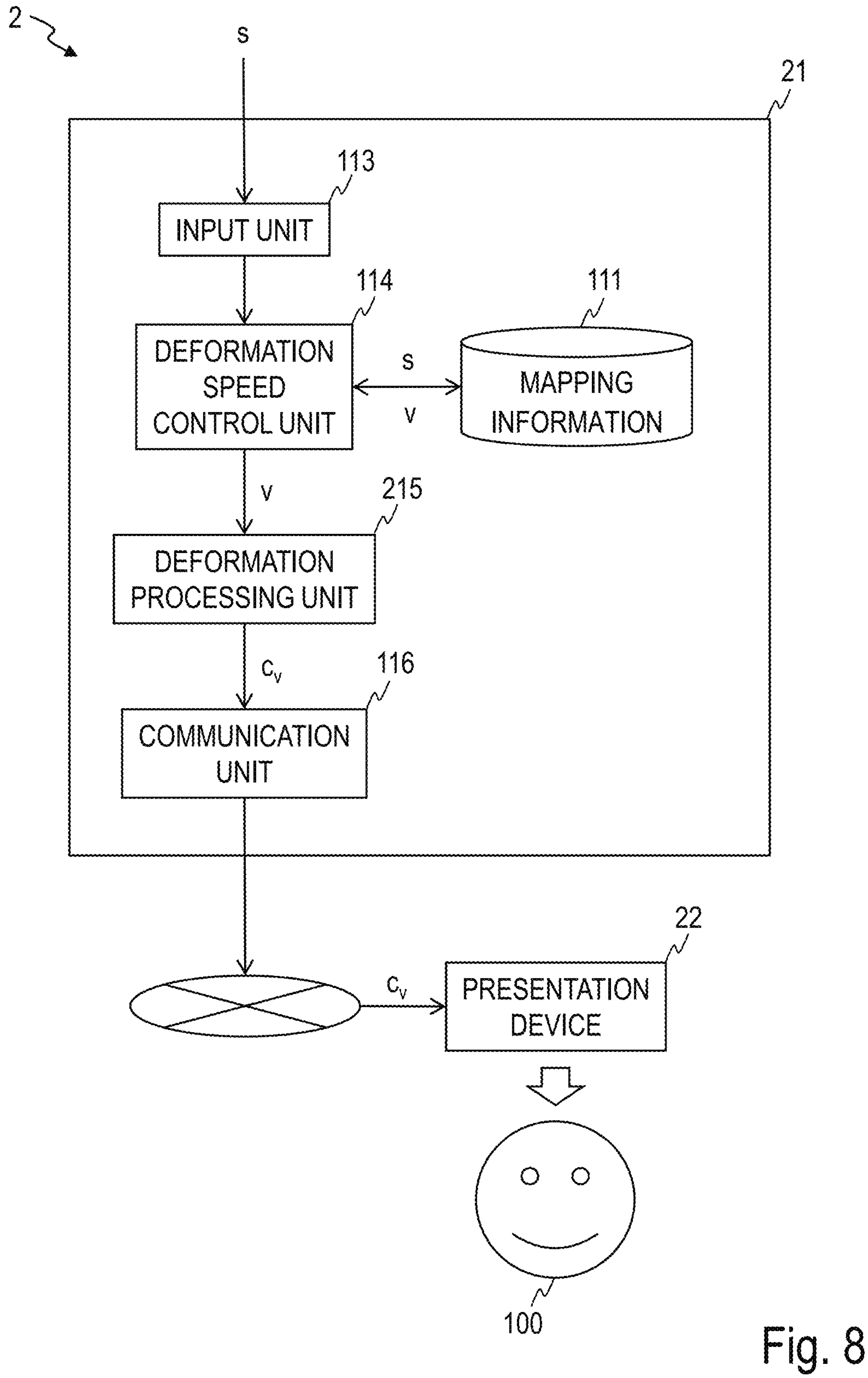
FIG. 8 is a block diagram illustrating a configuration of a softness impression presentation system 2 of a second embodiment.

As illustrated in FIG. 8, a softness impression presentation system 2 of the present embodiment includes a softness impression control device 21 and a presentation device 22. In the present embodiment, an example in which the softness impression control device 21 and the presentation device 22 are configured such that they can communicate via a network will be described. However, this does not limit the present invention. The softness impression control device 21 includes a storage unit 111, an input unit 113, a deformation speed control unit 114, a deformation processing unit 215, and a communication unit 116. A hardware configuration of the softness impression control device 21 will be described later. The presentation device 22 may be a device that visually presents a video image to the user 100, or may be a device that visually presents a mechanical motion to the user 100. Examples of the presentation device 22 include a display, a projector, VR goggles, and the like. Examples of the latter presentation device 22 include a device such as a tension/compression testing machine capable of deforming an object (presented visual target) from the outside at a designated speed, and a device such as a robot, a toy, or a product demonstrator in which an object (presented visual target) itself deforms at a designated speed.

<Preprocessing>

As preprocessing, the mapping information described in the first embodiment is stored in the storage unit 111.

<Softness Impression Control Processing>

The following softness impression control processing is executed on the premise of the above-described preprocessing. First, the softness impression control device 21 executes processing of steps S113 and S114 described in the first embodiment. The deformation speed index v obtained in step S114 is input to the deformation processing unit 215. The deformation processing unit 215 generates and outputs a command cy for deforming the presented visual target at the deformation speed based on the deformation speed index v (step S215). The command $c_v$ is transmitted to the outside via the communication unit 116, and is further sent to the presentation device 22. The presentation device 22 presents the presented visual target deforming at the deformation speed based on the deformation speed index v in accordance with the command $c_v$. For example, in a case in which the presentation device 22 is a device that visually presents a video image to the user 100, the presentation device 22 obtains and displays the presented visual target deforming at the deformation speed based on the deformation speed index v as described in the first embodiment or modified examples thereof. For example, in a case in which the presentation device 22 is a device that visually presents a mechanical motion to the user 100, the presentation device 22 mechanically moves the presented visual target (object) at the deformation speed (for example, the deformation speed indicated by the deformation speed index v) based on the deformation speed index v. The user 100 appreciates the presented visual target presented in this way and perceives the softness impression designated by the designation information s (step S216).

Modified Example of Second Embodiment

The second embodiment may be modified similarly to modified examples 1 to 3 of the first embodiment. That is, in the second embodiment, the softness impression control device 21 may control a deformation amount (maximum deformation amount) in addition to a deformation speed of a presented visual target to be presented. In addition, in the second embodiment, the softness impression control device 21 may be able to select a physical softness of a visual target (object) which is the basis of a presented visual target, in addition to control of the deformation speed. In the second embodiment, the softness impression control device 21 may independently control the deformation speed of each of a plurality of presented visual targets to be simultaneously presented.

Third Embodiment

The presentation device may present a presented visual target that presents a softness impression designated by the designation information s, and an imaging device may image the state to obtain a video image that presents the softness impression designated by the designation information s.

<Configuration>

Figure 9:
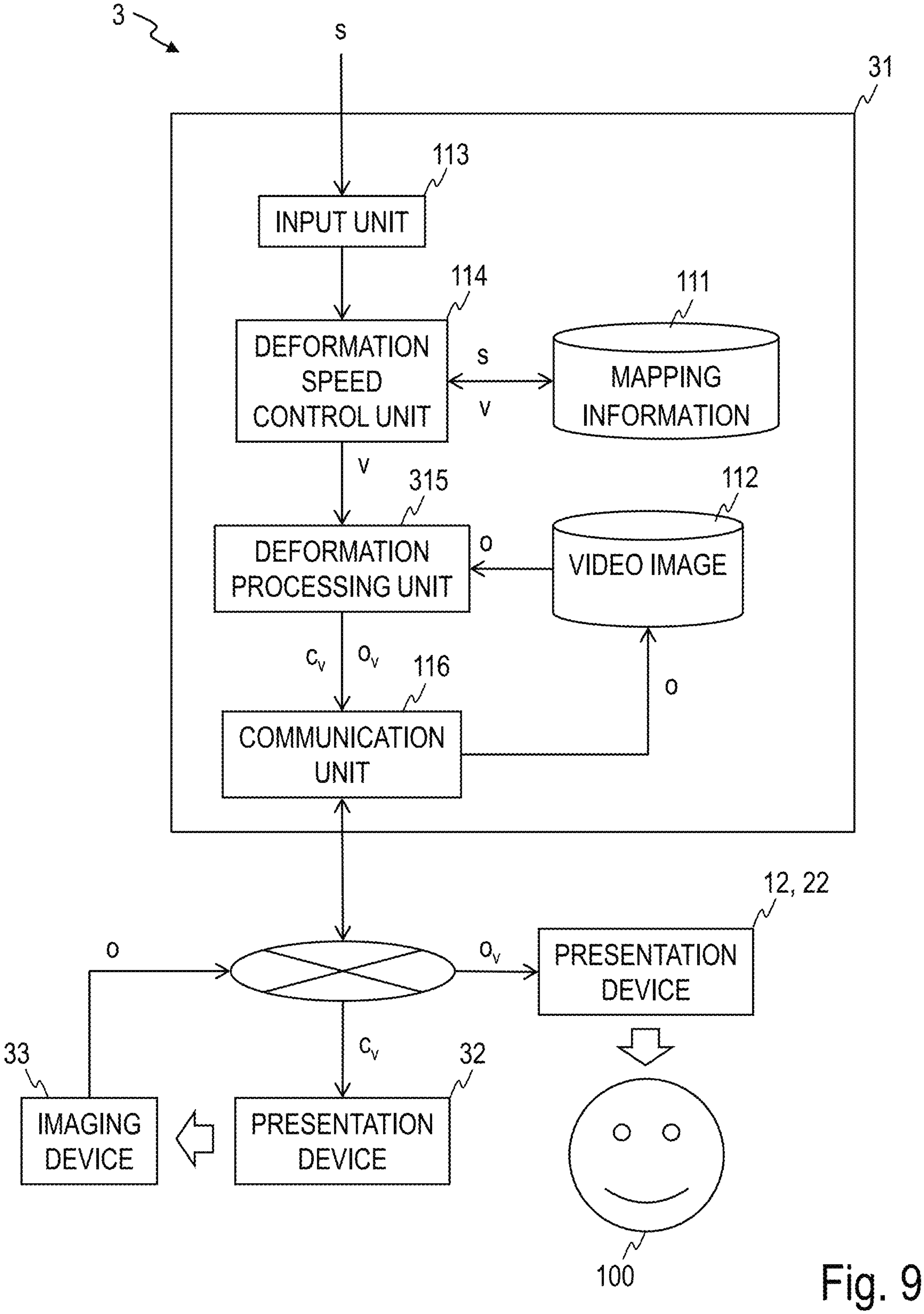
FIG. 9 is a block diagram illustrating a configuration of a softness impression presentation system 3 of a third embodiment.

As illustrated in FIG. 9, a softness impression presentation system 3 of the present embodiment includes a softness impression control device 31, a presentation device 12 or 22, a presentation device 32, and an imaging device 33. In the present embodiment, an example in which the softness impression control device 31, the presentation devices 12, 22, and 32, and the imaging device 33 are configured such that they can communicate via a network is shown. However, this does not limit the present invention. The softness impression control device 31 includes storage units 111 and 112, an input unit 113, a deformation speed control unit 114, a deformation processing unit 315, and a communication unit 116. A hardware configuration of the softness impression control device 31 will be described later. The presentation device 32 is a device that visually presents a mechanical motion to the user 100. The presentation device 32 is, for example, a device such as a tension/compression testing machine capable of deforming an object (presented visual target) from the outside at a designated speed, or a device such as a robot, a toy, or a product demonstrator in which an object (presented visual target) itself deforms at a designated speed. The imaging device 33 is, for example, a camera capable of capturing a moving image, such as a high-speed camera.

<Preprocessing>

As preprocessing, the mapping information described in the first embodiment is stored in the storage unit 111.

<Softness Impression Control Processing>

The following softness impression control processing is executed on the premise of the above-described preprocessing. First, the softness impression control device 31 executes processing of steps S113 and S114 described in the first embodiment. The deformation speed index v obtained in step S114 is input to the deformation processing unit 315. The deformation processing unit 315 generates and outputs a command $c_v$ for deforming the presented visual target at the deformation speed based on the deformation speed index v (step S315). The command $c_v$ is transmitted to the outside via the communication unit 116, and is further sent to the presentation device 32. The presentation device 32 mechanically moves the presented visual target (object) deforming at the deformation speed based on the deformation speed index v in accordance with the command $c_v$. That is, the presentation device 32 presents the presented visual target deformed in accordance with the command $c_v$ output from the deformation processing unit 315. The imaging device 33 images the presented visual target presented by the presentation device 32 to obtain and output a video image o of the presented visual target. The video image o is sent to the softness impression control device 31 via a network. The communication unit 116 of the softness impression control device 31 receives the video image o and stores the video image o in the storage unit 112 (step S316).

The video image o stored in the storage unit 112 is used as described in the first embodiment, the modified examples of the first embodiment, the second embodiment, or the modified example of the second embodiment, for example.

[Hardware Configuration]

The softness impression control devices 11, 21, and 31 in the respective embodiments are devices configured by a general-purpose or dedicated computer including, for example, a processor (hardware processor) such as a central processing unit (CPU) and a memory such as a random-access memory (RAM) and a read-only memory (ROM) executing a predetermined program. That is, each of the softness impression control devices 11, 21, and 31 according to the respective embodiments includes, for example, processing circuitry configured to implement each unit included in each of the softness impression control devices. This computer may include one processor and memory, or may include a plurality of processors and memories. The program may be installed into the computer, or may be recorded in a ROM or the like in advance. In addition, some or all processing units may be configured using electronic circuitry that independently implements a processing function, instead of electronic circuitry that implements a functional configuration by reading a program like a CPU. Further, electronic circuitry constituting one device may include a plurality of CPUs.

Figure 10:
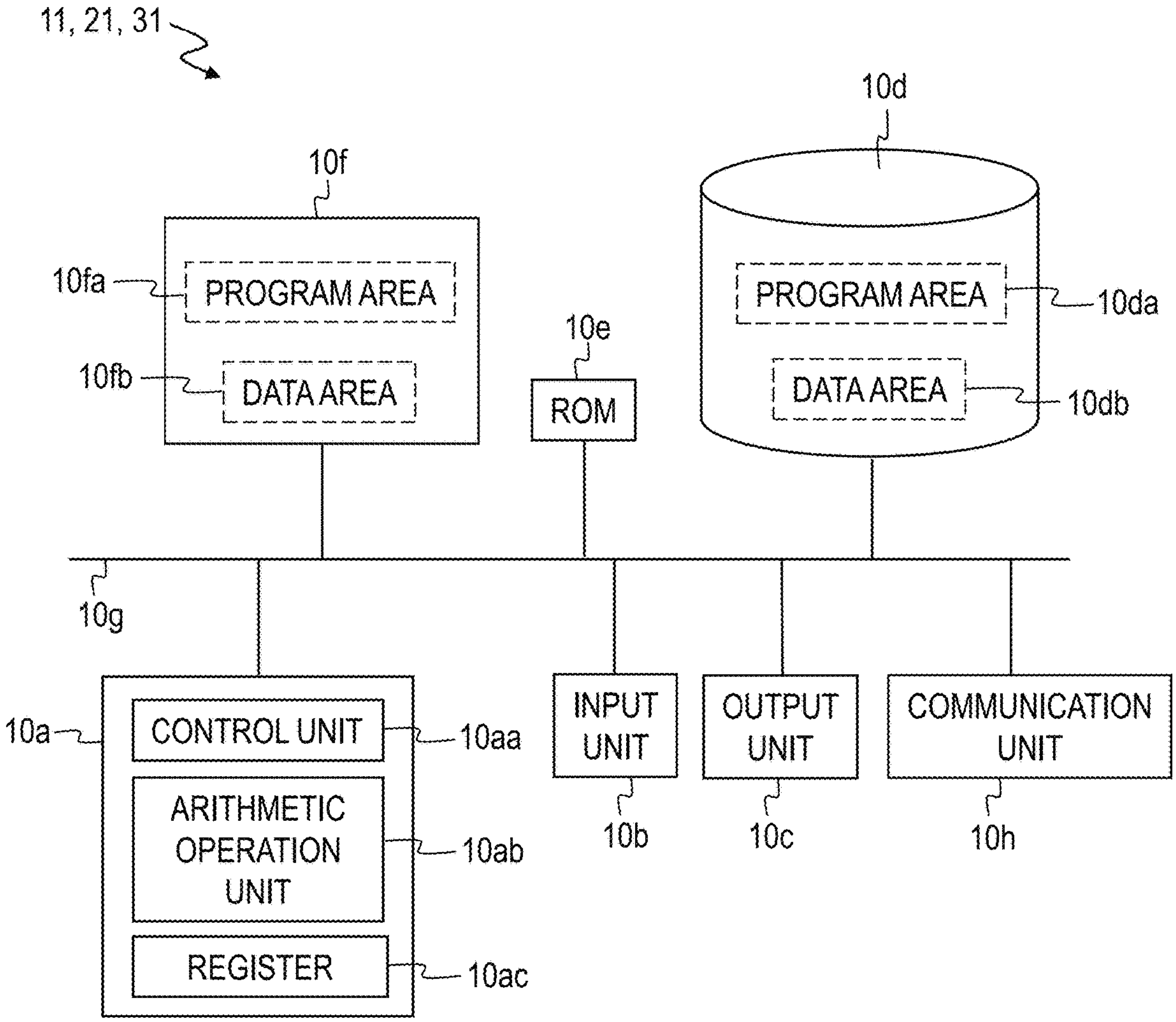
FIG. 10 is a diagram illustrating a hardware configuration of a softness impression control device of an embodiment.

FIG. 10 is a block diagram illustrating a hardware configuration of the softness impression control devices 11, 21, and 31 in the respective embodiments. As illustrated in FIG. 10, the softness impression control devices 11, 21, and 31 in this example include a central processing unit (CPU) 10*a*, an input unit 10*b*, an output unit 10*c*, a random access memory (RAM) 10*d*, a read only memory (ROM) 10*e*, an auxiliary storage device 10*f*, a communication unit 10*h*, and a bus 10*g*. The CPU 10*a* in this example includes a control unit 10*aa*, an arithmetic operation unit 10*ab*, and a register 10*ac*, and executes various arithmetic operations in accordance with various programs read into the register 10*ac*. Further, the input unit 10*b* is an input terminal, a keyboard, a mouse, a touch panel, or the like to which data is input. Further, the output unit 10*c* is an output terminal, a display, or the like from which data is output. The communication unit 10*h* is a LAN card or the like controlled by the CPU 10*a* that has read a predetermined program. Further, the RAM 10*d* is a static random-access memory (SRAM), a dynamic random-access memory (DRAM), or the like, and includes a program area 10*da* in which a predetermined program is stored and a data area 10*db* in which various kinds of data are stored. Further, the auxiliary storage device 10*f* is a hard disk, a magneto-optical disc (MO), a semiconductor memory, or the like, for example, and includes a program area 10*fa* in which a predetermined program is stored and a data area 10*fb* in which various kinds of data are stored. Further, the bus 10*g* connects the CPU 10*a*, the input unit 10*b*, the output unit 10*c*, the RAM 10*d*, the ROM 10*e*, the communication unit 10*h*, and the auxiliary storage device 10*f* such that information can be exchanged therebetween. The CPU 10*a* writes, into the program area 10*da* of the RAM 10*d*, the program stored in the program area 10*fa* of the auxiliary storage device 10*f* in accordance with a read operating system (OS) program. Similarly, the CPU 10*a* writes, into the data area 10*db* of the RAM 10*d*, the various kinds of data stored in the data area 10*fb* of the auxiliary storage device 10*f*. Addresses on the RAM 10*d* in which the program and the data have been written are stored into the register 10*ac* of the CPU 10*a*. The control unit 10*aa* of the CPU 10*a* sequentially reads these addresses stored in the register 10*ac*, reads the program and the data from the areas in the RAM 10*d* indicated by the read addresses, causes the arithmetic operation unit 10*ab* to sequentially execute arithmetic operations indicated by the program, and stores results of the arithmetic operations in the register 10*ac*. With such a configuration, the functional configurations of the softness impression control devices 11, 21, and 31 are realized.

The above-described program can be recorded in a computer-readable recording medium. Examples of the computer-readable recording medium include a non-transitory recording medium. Examples of such a recording medium are a magnetic recording device, an optical disk, a magneto-optical recording medium, a semiconductor memory, and the like.

The distribution of the program is performed by, for example, selling, transferring, or renting a portable recording medium such as a DVD or a CD-ROM in which the program is recorded. Furthermore, the program may be stored in a storage device of a server computer, and the program may be distributed by transferring the program from the server computer to another computer via a network. As described above, the computer executing such a program first stores a program recorded in a portable recording medium or a program transferred from the server computer temporarily into a storage device of the computer, for example. Then, at the time of executing processing, the computer reads the program stored in the storage device thereof and executes processing according to the read program. In addition, as another embodiment of the program, the computer may directly read the program from a portable recording medium and execute processing according to the program, and the computer may sequentially execute processing according to the received program each time the program is transferred from the server computer to the computer. In addition, the above-described processing may be executed by a so-called application service provider (ASP) type service that realizes a processing function only by an execution instruction and result acquisition without transferring the program from the server computer to the computer. Note that the program in this mode includes information used for processing by an electronic computer and is equivalent to the program (data or the like that is not a direct command to the computer but has a property that defines processing of the computer).

In each embodiment, the present device is configured by executing a predetermined program on a computer, but at least a part of the processing content may be realized as hardware.

Other Modified Examples

Note that the present invention is not limited to the above-described embodiments. For example, in each of the above-described embodiments, an example in which the softness impression control device and the presentation device or the imaging device are configured such that they can communicate via a network has been described. However, this does not limit the present invention, and the devices may be directly connected such that they can communicate, or the functions of the presentation device and the imaging device may be integrated into the softness impression control device. Alternatively, the softness impression control device may be dispersedly arranged as a plurality of devices, and the plurality of devices may be configured such that they can communicate.

Furthermore, the various types of processing described above may be executed not only in time series according to the description but also in parallel or individually according to the processing capability of the device that executes the processing or as necessary. In addition, it is needless to say that modifications can be appropriately made without departing from the gist of the present invention.

REFERENCE SIGNS LIST

1, 2, 3 Softness impression presentation system
11, 21, 31 Softness impression control device

114 Deformation speed control unit
115, 215, 315 Deformation processing unit
12, 22, 32 Presentation device
33 Imaging device

The invention claimed is:

1. A softness impression control device comprising processing circuitry configured to:

receive designation information, wherein the designation information specifies a softness impression for a presented visual target, wherein the softness impression is indicated by a softness index that describes apparent softness of the presented visual target;

transform, based on a correspondence between the softness index and a deformation speed index, the designation information into the deformation speed index, wherein the deformation speed index describes a deformation speed of the presented visual target; and deform, based on the deformation speed, the presented visual target to create the softness impression of the presented visual target as designated by the designation information.

2. The softness impression control device according to claim 1, wherein the softness impression is greater than another softness impression, the softness impression is indicated by the softness index corresponding to the deformation speed index indicating a first deformation speed, and said another softness impression is indicated by another softness-impression index corresponding to another deformation speed index indicating a second deformation speed that is lower than the first deformation speed.

3. The softness impression control device according to claim 1, wherein the presented visual target comprises a first presented visual target and a second presented visual target, the second presented visual target is presented together with the first presented visual target, and the processing circuitry is further configured to execute operations comprising:

receiving first designation information and second designation information, wherein the first designation information designates a first softness impression for the first presented visual target, the second designation information designates a second softness impression for the second presented visual target; and obtaining a first deformation speed index and a second deformation speed index, wherein the first deformation speed index corresponds to the first softness index indicating the first softness impression designated by the first designation information, and the second deformation speed index corresponds to the second softness index indicating the second softness impression designated by the second designation information.

4. The softness impression control device according to claim 1, wherein the processing circuitry is configured to further dynamically update the presented visual target deforming at the deformation speed based on the deformation speed index.

5. The softness impression control device according to claim 4, wherein a first deformation speed based on the deformation speed index in a first time interval is different from a second deformation speed based on the deformation speed index in a second time interval, and the second time interval is distinct from the first time interval.

6. A softness impression presentation system comprising the softness impression control device according to claim 4, wherein the softness impression control device outputs a command for deforming the presented visual target at the deformation speed based on the deformation speed index, and the softness impression presentation system further comprises:

a presentation device configured to deform the presented visual target according to the command; and an imaging device configured to render image the presented visual target presented by the presentation device and to create a video image of the presented visual target being deformed.

7. A softness impression control method of a softness impression control device, the method comprising:

receiving designation information, wherein the designation information specifies a softness impression for a presented visual target, wherein the softness impression is indicated by a softness index that describes apparent softness of the presented visual target;

transforming, based on a correspondence between the softness index and a deformation speed index, the designation information into the deformation speed index, wherein the deformation speed index describes a deformation speed of the presented visual target; and deforming, based on the deformation speed, the presented visual target to create the softness impression of the presented visual target as designated by the designation information.

8. A non-transitory computer-readable recording medium storing program for causing a computer to serve as the softness impression control device according to claim 1.

* * * * *